United States Patent
Okada et al.

(10) Patent No.: US 7,462,330 B2
(45) Date of Patent: Dec. 9, 2008

(54) EXHAUST GAS TREATMENT APPARATUS

(75) Inventors: Kenichi Okada, Hiroshima-ken (JP); Shintaro Honjo, Hiroshima-ken (JP); Susumu Okino, Hiroshima-ken (JP); Toru Takashina, Hiroshima-ken (JP); Masashi Yoshikawa, Hiroshima-ken (JP); Tsuyoshi Oishi, Hiroshima-ken (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 378 days.

(21) Appl. No.: 11/204,385

(22) Filed: Aug. 16, 2005

(65) Prior Publication Data

US 2006/0093534 A1    May 4, 2006

(30) Foreign Application Priority Data

Nov. 1, 2004    (JP)    ............... 2004-317663

(51) Int. Cl.
B01D 50/00    (2006.01)
B01D 53/34    (2006.01)

(52) U.S. Cl. ............... 422/168; 422/171; 422/172; 422/177

(58) Field of Classification Search ........... 422/168, 422/171, 172, 177
See application file for complete search history.

(56) References Cited

U.S. PATENT DOCUMENTS

| | | | |
|---|---|---|---|
| 3,683,593 A | 8/1972 | Kent | |
| 5,605,552 A | 2/1997 | Shimizu et al. | |
| 5,605,655 A | 2/1997 | Ishihara et al. | |
| 5,616,290 A | 4/1997 | Ishihara et al. | |
| 5,879,639 A | 3/1999 | Tatani et al. | |
| 6,138,378 A | 10/2000 | Takashina et al. | |
| 2005/0046052 A1* | 3/2005 | Okada et al. | 261/115 |

FOREIGN PATENT DOCUMENTS

| | | |
|---|---|---|
| CN | 1478585 | 3/2004 |
| CN | 2635194 | 8/2004 |
| EP | 0 882 487 A1 | 12/1998 |
| JP | 59-53828 | 4/1984 |
| JP | 7-275742 | 10/1995 |
| JP | 7-308539 | 11/1995 |
| JP | 9-206549 | 8/1997 |
| JP | 9-225256 | 9/1997 |
| JP | 10156129 A | 6/1998 |
| JP | 11-47538 | 2/1999 |

OTHER PUBLICATIONS

Search Report for corresponding European Application No. 05 29 2234 mailed Aug. 30, 2006.
Office Action for corresponding Chinese Application No. 200510082497.7 mailed Mar. 16, 2007.

* cited by examiner

*Primary Examiner*—Walter D Griffin
*Assistant Examiner*—Lessanework T Seifu
(74) *Attorney, Agent, or Firm*—Westerman, Hattori, Daniels & Adrian, L.L.P.

(57) ABSTRACT

A liquid column type exhaust gas treatment apparatus comprising a spray header (2) for injecting an absorbing solution upward in an absorption tower (1), wherein exhaust gas introduced from a lower part of the absorption tower (1) and the absorbing solution injected from the spray header (2) are brought into gas-liquid contact with each other, by which desulfurization of exhaust gas is accomplished, characterized in that drift preventing plates (5a and 5b) are provided in a liquid top portion of a liquid column (6) formed by the absorbing solution and/or at the installation position of the spray header (2).

6 Claims, 5 Drawing Sheets

- 47 NOZZLE
- 45 DUMMY PIPE
- 42
- GAS FLOW — 48

- 45a UPPER-STAGE DUMMY PIPE
- 45b LOWER-STAGE DUMMY PIPE
- 42a UPPER-STAGE SPRAY PIPE
- 42b LOWER-STAGE SPRAY PIPE
- 800

EXHAUST GAS TREATMENT APPARATUS

BACKGROUND OF THE INVENTION

1. Technical Field

The present invention relates to an exhaust gas treatment apparatus.

2. Background Art

The applicant has developed a liquid column absorption tower, in which an absorbing solution is sprayed (injected) upward to clean exhaust gas, as an absorbing device for cleaning exhaust gas in wet type exhaust gas desulfurization equipment, and this liquid column absorption tower has been used practically (Japanese Utility Model Provisional Publication No. 59-053828). In the liquid column absorption tower, a liquid column is formed by spraying (injecting) the absorbing solution upward from a spray header.

The absorbing solution, which is injected from the spray header and sprayed upward, disperses in a top portion, and then falls. The falling absorbing solution and sprayed-up absorbing solution collide with each other to form fine particles. Therefore, the gas-liquid contact area per unit volume increases as compared with a packed absorption tower. Also, the absorbing solution disperses and exists in a particulate form, and further exhaust gas is effectively entangled with the blowup flow of absorbing solution in the vicinity of a nozzle, so that the absorbing solution and exhaust gas are effectively mixed with each other, and hence the gas-liquid contact efficiency is increased. Therefore, due to these effects, the volume of an absorption tower can be comparatively small. Also, unlike a packed absorption tower, there is no need for a packing material to be cleaned and replaced. Further, since the liquid column absorption tower has no moving parts, there is no need for maintenance, and therefore an operator skilled in operation is not needed. Still further, a liquid column absorption tower has the advantage that the pressure loss of exhaust gas in the absorption tower is low as compared with a packed absorption tower.

For the absorption tower in which exhaust gas flows in the direction opposite to that which falling liquid drops, exhaust gas is introduced into the absorption tower from the lower side surface thereof. Because of the restriction of absorption tower arrangement, the construction is such that the flow of the introduced gas suddenly changes from a direction horizontal to the absorption tower to a vertical direction at this time.

It is known that the residence time of liquid drops increases as the flow velocity of exhaust gas increases, and the gas-side mass transfer resistance decreases, so that the absorbing performance is improved. However, this phenomenon is limited to the case of ideal gas flow (straightened and uniform gas flow without gas drift). In practice, if the flow velocity of exhaust gas is increased, the liquid drops disperse unevenly, and channeling (blowing through) is produced locally by the gas drift in the absorption tower, by which the absorbing performance is sometimes degraded. This problem is liable to arise especially when the size of absorption tower is increased.

DISCLOSURE OF THE INVENTION

In view of the above circumstances, an object of the present invention is to provide an exhaust gas treatment apparatus in which even if the flow velocity of exhaust gas is increased, liquid drops disperse without the occurrence of unevenness of liquid drops, and channeling (blowing through) is not produced locally by gas drift in an absorption tower, by which the absorbing performance is improved.

To achieve the above object, the exhaust gas treatment apparatus in accordance with the present invention is a liquid column type exhaust gas treatment apparatus comprising a spray header for injecting an absorbing solution upward in an absorption tower, wherein exhaust gas introduced from a lower part of the absorption tower and the absorbing solution injected from the spray header are brought into gas-liquid contact with each other, by which desulfurization of exhaust gas is accomplished, characterized in that drift preventing plates are provided in a liquid top portion of a liquid column formed by the absorbing solution and/or at the installation position of the spray header.

In the exhaust gas treatment apparatus in accordance with the present invention, as an embodiment thereof, the installation positions of drift preventing plates in the liquid top portion of the liquid column formed by the absorbing solution may be over a length of 10 to 40% of a liquid column height.

The exhaust gas treatment apparatus in accordance with the present invention is, in another embodiment thereof, a liquid column type exhaust gas treatment apparatus comprising a spray header for injecting an absorbing solution upward in an absorption tower, wherein exhaust gas introduced from a lower part of the absorption tower and the absorbing solution injected from the spray header are brought into gas-liquid contact with each other, by which desulfurization of exhaust gas is accomplished, characterized in that a columnar liquid drop dispersing member is provided on the upper side and/or the lower side of the spray header. In this embodiment, the columnar liquid drop dispersing member is preferably formed by a member having substantially the same construction as that of a header pipe forming the spray header. Also, in this embodiment, the columnar liquid drop dispersing member can be provided so that exhaust gas is introduced from the side surface side. Generally, the exhaust gas is introduced from the side surface of absorption tower lower part under the liquid drop dispersing member, not from the side surface of the liquid drop dispersing member. Therefore, the exhaust gas itself is introduced from under the liquid drop dispersing member. However, the exhaust gas is introduced from the side surface direction of the liquid drop dispersing member as viewed from the tower top portion of the absorption tower. The phrase "from the side surface side" means this fact. Further, in this embodiment, the columnar liquid drop dispersing member can be located at an intermediate position of adjacent nozzles above the spray header as viewed from the tower top portion of the absorption tower.

According to the present invention, there is provided an exhaust gas treatment apparatus in which even if the flow velocity of exhaust gas is increased, liquid drops disperse without the occurrence of unevenness of liquid drops, and channeling (blowing through) is not produced locally by gas drift in the absorption tower, by which the absorbing performance is improved.

BEST MODE FOR CARRYING OUT THE INVENTION

An exhaust gas treatment apparatus in accordance with the present invention will now be described with reference to embodiments shown in the accompanying drawings.

Figure 1:
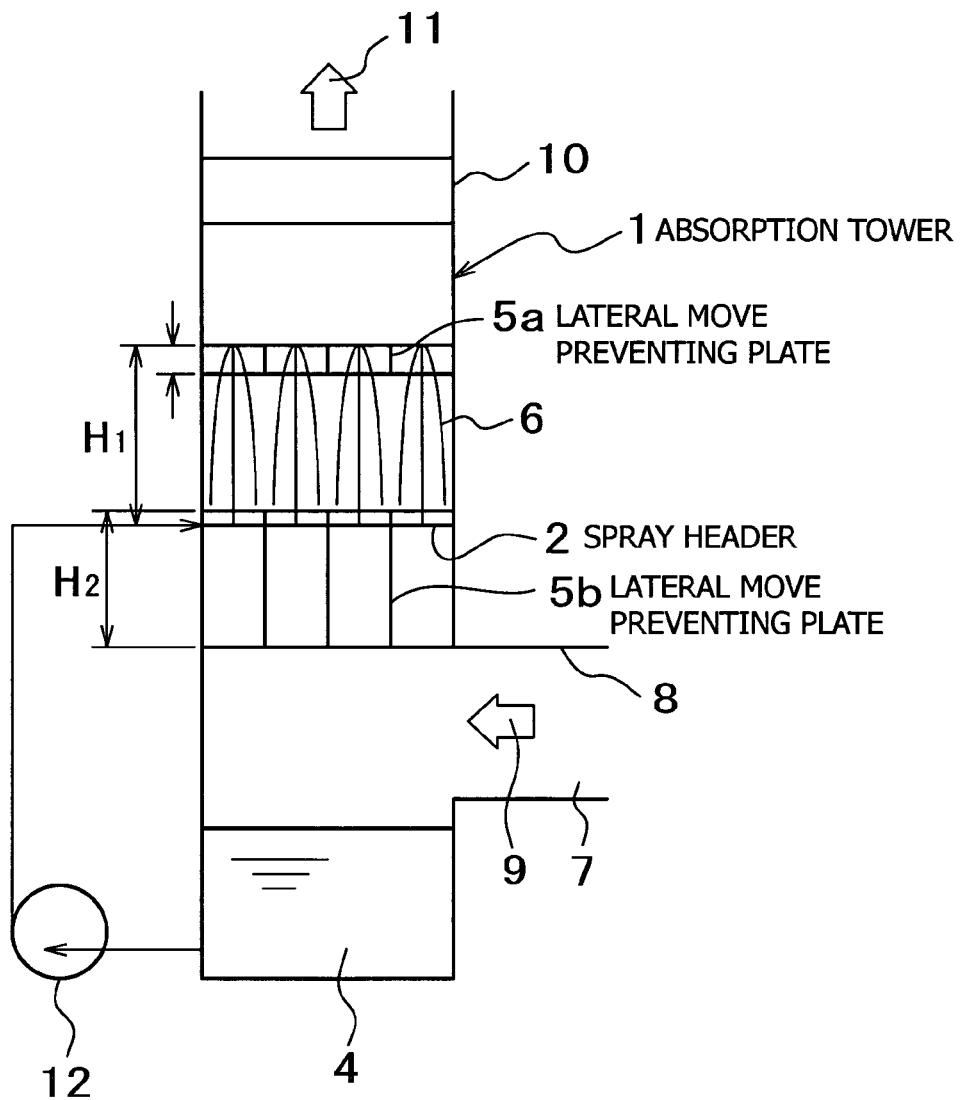
FIG. 1 shows a schematic sectional view for illustrating one embodiment of an exhaust gas treatment apparatus in accordance with the present invention.
Figure 2:
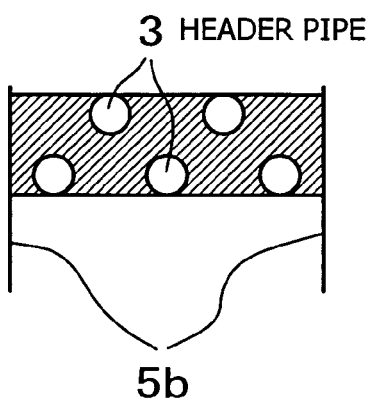
FIG. 2 shows a schematic sectional view for illustrating an installation state of header pipes 3 in the embodiment shown in FIG. 1.

FIG. 1 schematically shows a part of an absorption tower 1, showing one embodiment of the exhaust gas treatment apparatus in accordance with the present invention. The absorption tower 1 is provided with a spray header 2 for injecting an absorbing solution upward therein. The spray header 2 is usually formed with a plurality of header pipes, and a plurality of nozzles are provided usually at equal intervals. In this embodiment, the header pipes 3 are arranged vertically in a zigzag form as viewed from an untreated gas introduction port as shown in FIG. 2.

The absorbing solution contains an absorbent in a liquid form, and is also called absorbent slurry or absorbing solution slurry, these being assumed substantially to be the same. As the absorbent, limestone ($CaCO_3$), hydrated lime ($Ca(OH)_2$) and quicklime ($CaO$) generally used in the wet type lime-gypsum method can be cited. A bottom portion of the absorption tower 1 is constructed as a storage tank 4 for storing such an absorbing solution.

Figure 3:
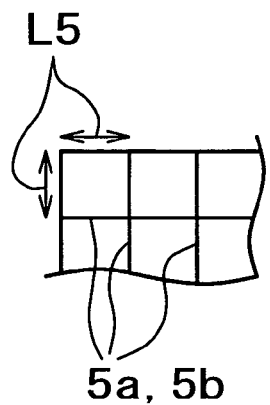
FIG. 3 shows a plan view for illustrating drift preventing plates in the embodiment shown in FIG. 1.

Further, in this embodiment, drift preventing plates 5a and 5b for a liquid column are provided. When viewed from the side surface in the figure, the drift preventing plates 5a and 5b are erected vertically, three plates each being shown. Also, only four formed liquid columns 6 are shown. However, this arrangement is only a schematic one, and the number of drift preventing plates and the number of liquid columns are not subject to any restriction. As shown in FIG. 3, the drift preventing plates 5a and 5b are provided so as to partition a rise portion of the absorption tower 1 in cross section as viewed from the tower top. Each section divided in a lattice form by the drift preventing plates 5a and 5b or by the wall surfaces of the absorption tower 1 and the drift preventing plates 5a and 5b is favorably of a rectangular shape, more favorably of a square shape. Depending on the cross-sectional shape and size of absorption tower, the side (L5 in FIG. 3) should be not longer than 5 m, favorably not longer than 3 m.

In FIG. 1, the drift preventing plates 5a and 5b are provided so as to correspond to liquid top portions of the formed liquid columns 6 and the position at which the spray header 2 is provided. However, they can be provided in either the liquid top portions or the positions corresponding to the position at which the spray header 2 is provided.

In the case where a length between the header pipe (spray pipe) 3 and the liquid top portion upper end is taken as a liquid column height H1 and the drift preventing plates 5a and 5b are provided so as to correspond to the liquid top portion, it is preferable that the drift preventing plates 5a be provided over a length of 10 to 40% of the liquid column height H1 from the liquid top portion upper end. Since the liquid loses its vertical velocity at the liquid top portion upper end, if the gas flow drifts, the gas tends to flow greatly in the lateral direction. Therefore, the provision of the drift preventing plates 5a in the upper part of the liquid top portion has an effect of preventing this flow. In this case, the drift preventing plates 5a are provided so that the upper ends thereof coincide with or go beyond the liquid top portion upper end.

Further, in the case where the header pipes 3 are arranged in a zigzag form, it is preferable that the drift preventing plates 5b, which are provided so as to correspond to the position at which the spray header 2 is provided, contain a portion ranging from the upper-stage pipe upper end to the lower-stage pipe lower end. The drift preventing plates 5b are preferably provided so that the lower part thereof extends to a length H2 whose lower limit is an upper end 8 of an inlet duct 7 in the longest case. The reason for this is that the falling liquid under the header 2 is prevented from being drifted by a gas drift produced when the flow direction of gas introduced from the inlet duct 7 is suddenly changed from horizontal to vertical.

In the exhaust gas treatment apparatus in accordance with the embodiment shown in FIG. 1, when untreated gas 9 is introduced into the absorption tower 1, the flow thereof is changed suddenly from horizontal direction to vertical direction in the absorption tower 1.

Conventionally, if the gas flow has drifted by this sudden change of flow direction, the liquid falling from the liquid column 6 has drifted in the lateral direction, so that it has sometimes been not possible to maintain uniform liquid dispersion of liquid column portion. In this case, the falling absorbing solution and the sprayed-up absorbing solution have not collided with each other evenly, and thus fine particles have not been formed, so that it has sometimes been not possible to increase the gas-liquid contact area.

In this embodiment, even at a high gas flow velocity, the gas flow in the absorption tower 1 is prevented from drifting, and also the drift of falling liquid of the liquid column 6 is prevented. Thereby, absorbing liquid drops having a fine particle shape can be dispersed evenly. Therefore, the absorbing performance is improved. Also, the size of apparatus can be reduced comparatively, which can also meet the restriction of absorption tower arrangement in the plant.

After the gas-liquid contact, exhaust gas is discharged as treated gas 11 having been subjected to wet desulfurization after mist is removed by a mist eliminator 10. A pump 12 circulates the absorbing solution from the storage tank 4 to the spray header 2.

Although FIG. 1 shows only the configuration of the outline of the absorption tower 1, the additional provision of ordinary peripheral equipment and control equipment, which are usually used by the person skilled in the art, is also embraced in the technical scope of the present invention.

Figure 4:
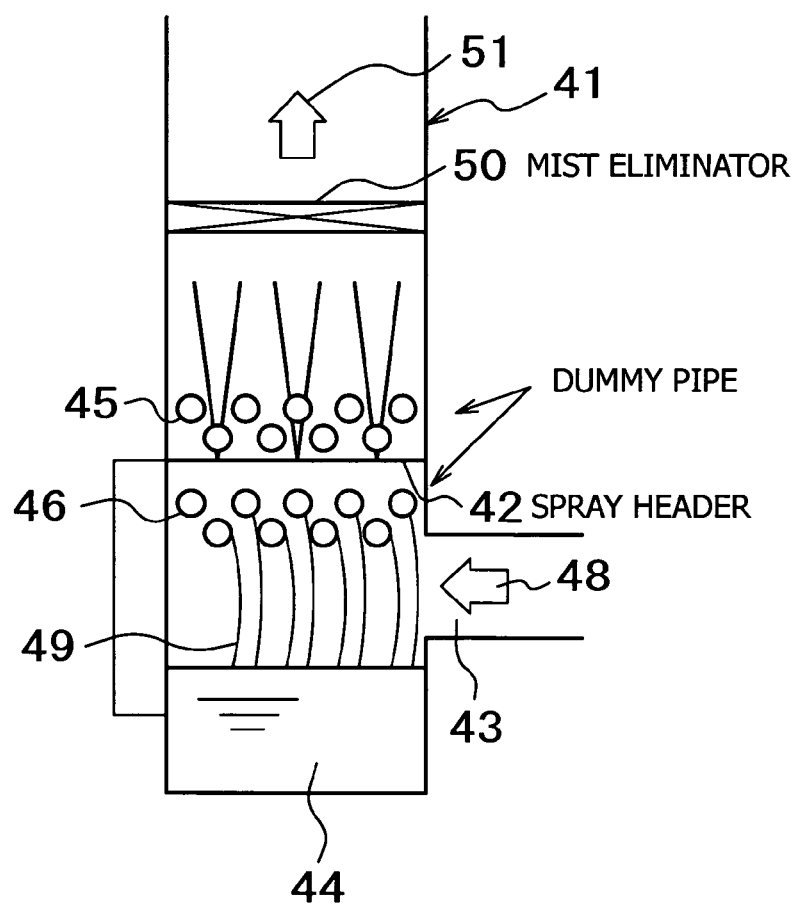
FIG. 4 shows a schematic sectional view for illustrating another embodiment of an exhaust gas treatment apparatus in accordance with the present invention.

FIG. 4 shows another embodiment of the exhaust gas treatment apparatus in accordance with the present invention. FIG. 4 also shows a part of an absorption tower 41 schematically. The absorption tower 41 is provided with a spray header 42 for injecting an absorbing solution upward therein. The spray header 42 is usually formed with a plurality of header pipes, and a plurality of nozzles is provided usually at equal intervals. In this embodiment, the header pipes 3 are arranged vertically in a zigzag form as viewed from an untreated gas introduction port 43 as in the embodiment shown in FIG. 1.

The absorbing solution contains an absorbent in a liquid form, and is also called absorbent slurry or absorbing solution slurry, these being assumed substantially to be the same. As the absorbent, limestone ($CaCO_3$), hydrated lime ($Ca(OH)_2$) and quicklime ($CaO$) generally used in the wet type lime-gypsum method can be cited. A bottom portion of the absorption tower 41 is constructed as a storage tank 44 for storing such an absorbing solution.

In this embodiment, as a columnar liquid drop dispersing member, dummy pipes 45 and 46, which are formed by members having substantially the same construction as that of the header pipes forming the spray header 42, are provided over and under the spray header 42. Between the dummy pipes 45 and 46 and the spray header 42, there is provided a distance of about 1 to 1.5 times of the distance between the upper and lower stages of the header pipes 3 arranged in a zigzag form. The reason for this is that the gas-liquid mixing state in the vicinity of the spray pipe changes according to the pipe diameter and pipe pitch, and if the distance is too long, the interaction with respect to the gas-liquid contact rate between the spray header 42 and the dummy pipes 45 and 46 decreases, and if the distance is too short, contraction of gas and liquid occurs excessively, which results in a sudden increase in pressure loss.

Like the header pipes, the dummy pipes 45 and 46 are formed by hollow pipes. In FIG. 4, the dummy pipes 45 and 46 are shown schematically in cross section. The dummy pipes 45 and 46 are also arranged in a zigzag form like the header pipes forming the spray header 42.

Figure 5A:
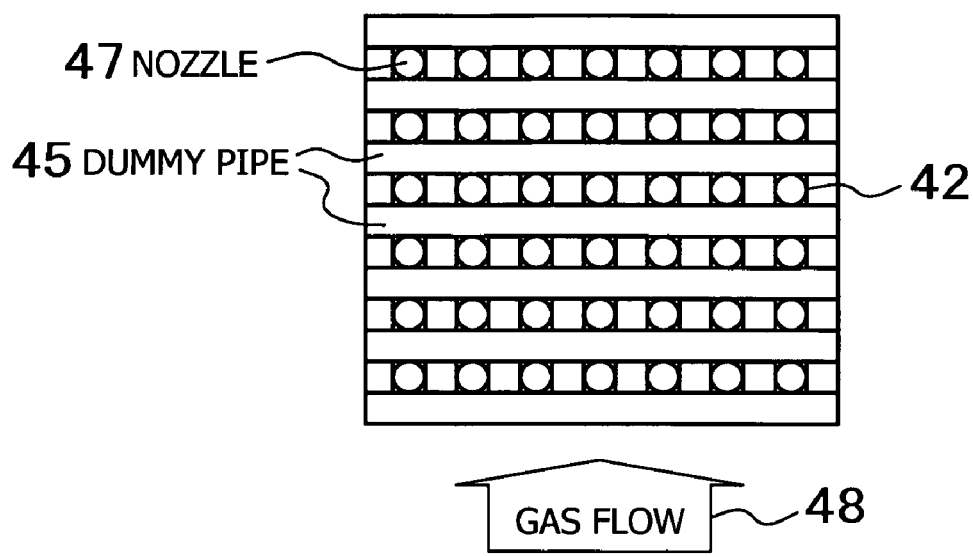
FIG. 5(a) shows a plan view for illustrating the positional relationship between upper dummy pipes and spray pipes in the embodiment shown in FIG. 4, viewed from the tower top.
Figure 5B:
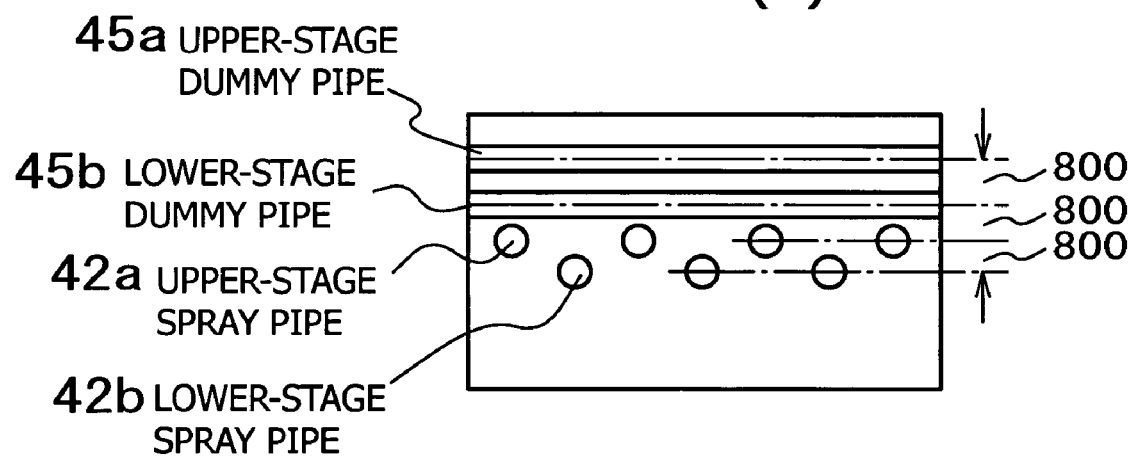
FIG. 5(b) shows a front view for illustrating the positional relationship between upper dummy pipes and spray pipes in the embodiment shown in FIG. 4, viewed from an exhaust gas introduction port.

FIGS. 5(a) and 5(b) show the positional relationship between the upper dummy pipes 45 and the spray header 42.

FIG. 5(a) is a view in which the interior of the absorption tower 41 is viewed from the tower top. In this figure, the lower dummy pipes 46 are excluded. As shown in FIG. 5(a), between the dummy pipes 45, nozzles 47 of the spray header 42 are located. An arrow mark 48 shows the flow direction of gas from an untreated gas introduction port 43.

FIG. 5(b) shows the interior of the absorption tower 41 viewed from the untreated gas introduction port 43 side. Upper-stage dummy pipes 45a and lower-stage dummy pipes 45b on the upper side are arranged in a zigzag form. Also, upper- and lower-stage header pipes 42a and 42b are also arranged in a zigzag form.

As seen from FIGS. 5(a) and 5(b), untreated exhaust gas 48 is introduced from the side surface side between the upper-stage dummy pipes 45a and the lower-stage dummy pipes 45b.

Figure 6A:
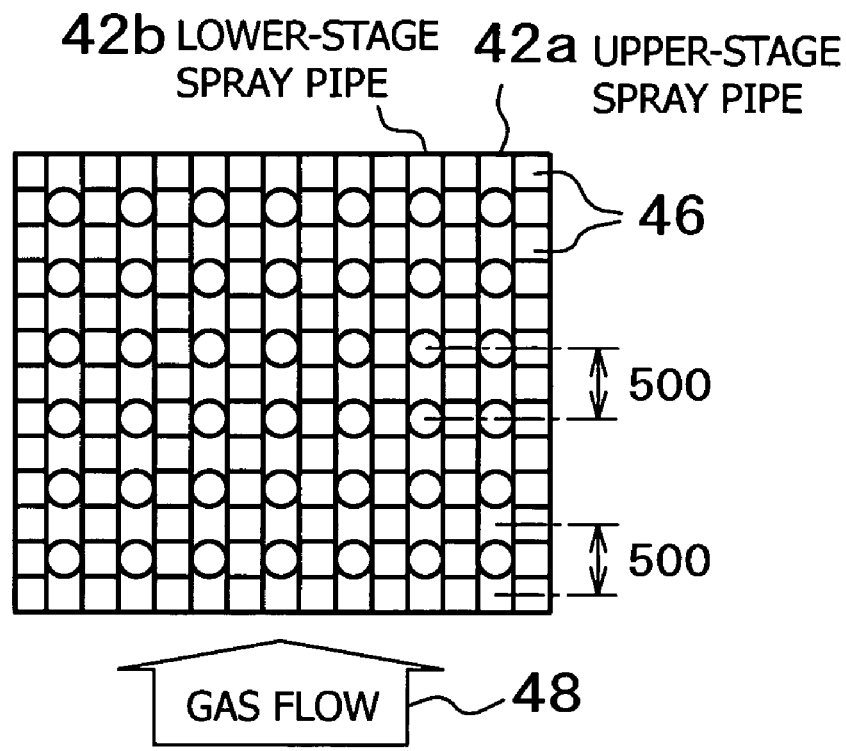
FIG. 6(a) shows a plan view for illustrating the positional relationship between lower dummy pipes and spray pipes in the embodiment shown in FIG. 4, viewed from the tower top.
Figure 6B:
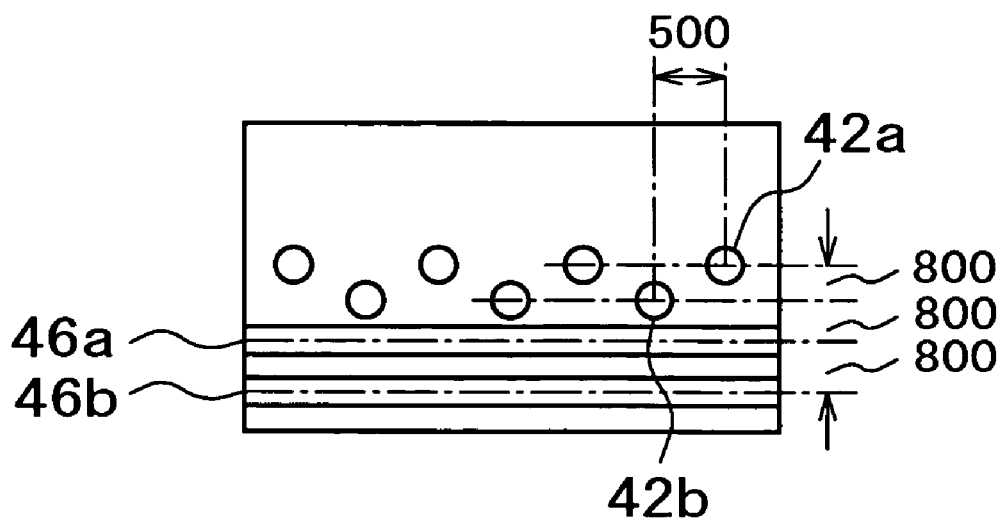
FIG. 6(b) shows a front view for illustrating the positional relationship between lower dummy pipes and spray pipes in the embodiment shown in FIG. 4, viewed from an exhaust gas introduction port.

FIGS. 6(a) and 6(b) show the positional relationship between the lower dummy pipes 46 and the spray header 42.

FIG. 6(a) is a view in which the interior of the absorption tower 41 is viewed from the tower top. In this figure, the upper dummy pipes 45 are excluded. As shown in FIG. 6(a), between the dummy pipes 46, the nozzles 47 of the spray header 42 are located. The arrow mark 48 shows the flow direction of gas from the untreated gas introduction port 43.

FIG. 6(b) shows the interior of the absorption tower 41 viewed from the untreated gas introduction port 43 side. Upper-stage dummy pipes 46a and lower-stage dummy pipes 46b on the lower side are arranged in a zigzag form. Also, the upper- and lower-stage header pipes 42a and 42b are also arranged in a zigzag form.

As seen from FIGS. 6(a) and 6(b), the untreated exhaust gas 48 is introduced from the side surface side between the upper-stage dummy pipes 46a and the lower-stage dummy pipes 46b.

Figure 7:
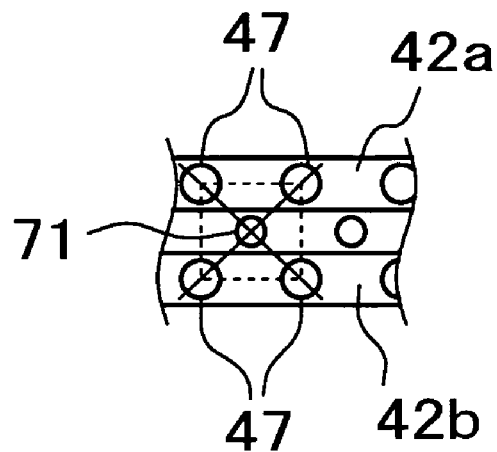
FIG. 7 shows a partial plan view for illustrating the relationship between nozzle and liquid drop dispersion.

As described above, in this embodiment, as shown in FIG. 7, a region 71 having a falling liquid amount larger than that of other regions is produced on the diagonal lines of a unit lattice formed by the centers of a total of four nozzles 47 consisting of the two nozzles 47 adjoining above the header pipe 42a and the two nozzles 47 adjoining above the adjacent header pipe 42b. Therefore, as explained with reference to FIGS. 5 and 6, in this embodiment, the dummy pipes 45 and 46 are provided so as to lap on this region 71.

In the exhaust gas treatment apparatus in accordance with this embodiment shown in FIG. 4, when the untreated gas 48 is introduced into the absorption tower 41, the flow thereof is suddenly changed from a horizontal direction to a vertical direction in the absorption tower 41.

Conventionally, if the gas flow has drifted from this sudden change of flow direction, unevenness of liquid drop dispersion has also occurred, and the untreated gas has blown through a portion in which liquid drops has existed in smaller amounts. Therefore, gas-liquid contact cannot be accomplished sufficiently, so that in some cases, the gas-liquid contact area cannot be increased substantially.

In this embodiment, even at a high gas flow velocity, after microscopically staying on the upper surface of the upper and lower dummy pipes 45 and 46, the absorbing solution continuously falls along the surface, by which a water curtain 49 perpendicular to the gas flow direction is formed. This effect is further enhanced by the arrangement explained with reference to FIG. 7.

Thereby, a phenomenon that, due to the influence of gas drift, a high-concentration gas blows through without coming into contact with the absorbing solution sufficiently (channeling) can be prevented. Also, due to the collision of the absorbing solution falling from the upside with the dummy pipes 45 and 46, liquid drops are made fine, so that liquid drops having a fine particle shape can be dispersed evenly. Therefore, the gas-liquid contact area is increased, so that the desulfurizing performance is improved. Also, the gas flow velocity can be increased, and thus the size of apparatus can be reduced comparatively, which can also meet the restriction of absorption tower arrangement in the plant.

After the gas-liquid contact, exhaust gas is discharged as treated gas 51 having been subjected to wet desulfurization after mist is removed by a mist eliminator 50. The absorbing solution from the storage tank 44 circulates and is sent to the spray header 42.

Although FIG. 4 shows only the configuration of the outline of the absorption tower 41, the additional provision of ordinary peripheral equipment and control equipment, which are usually used by the person skilled in the art, is also embraced in the technical scope of the present invention.

Although the dummy pipes 45 and 46 are provided over and under the spray header 42 in this embodiment, these pipes can be provided only either over or under the spray header 42. Further, although the dummy pipes are used in this embodiment, any columnar liquid drop dispersing member that achieves an equivalent effect can be used in the present invention.

EXAMPLES 1 TO 4

Figure 8:
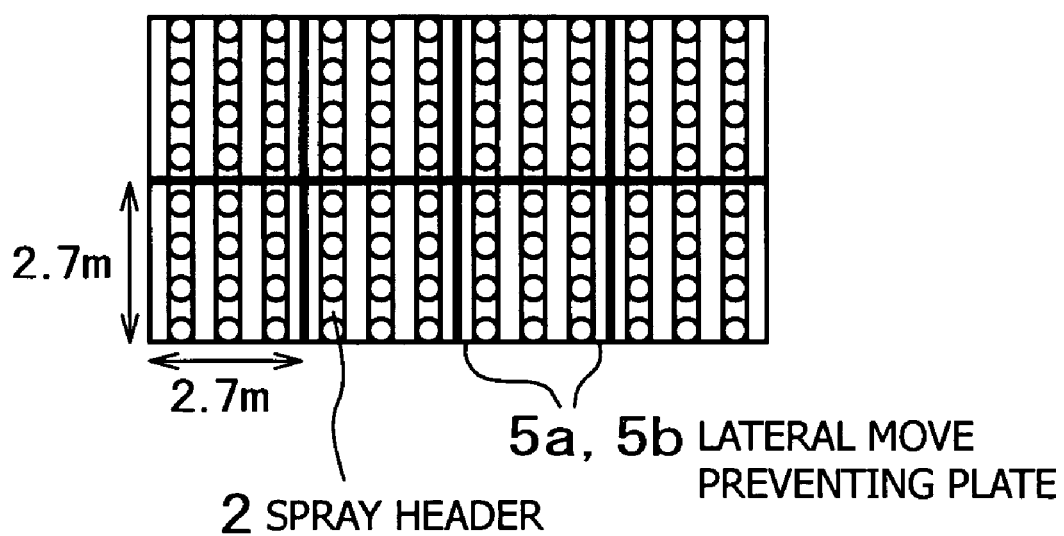
FIG. 8 shows a plan view for illustrating drift preventing plates used in examples 5 to 8.

Four types of tests with the following specifications were conducted by using the drift preventing plates 5a and 5b of the embodiment shown in FIG. 1. In the test, an exhaust simulated gas was introduced from a lower part of the absorption tower 1, desulfurization was accomplished by using limestone slurry, and SO$_2$ was measured at the outlet in tower top portion to evaluate the performance. As shown in FIG. 8, one section of the drift preventing plates 5a and 5b was made a square of 2.7 m as viewed from the tower top.

Example 1: Drift preventing plates not provided;
Example 2: Drift preventing plates 5a provided;
Example 3: Drift preventing plates 5b provided; and
Example 4: Both drift preventing plates 5a and 5b provided.

Test Conditions and Results

The test conditions and results are given in Table 1.

TABLE 1

| Example | Example 1 | Example 2 | Example 3 | Example 4 |
|---|---|---|---|---|
| In-tower temperature [° C.] | 50 | 50 | 50 | 50 |
| Gas flow velocity [m/s] | 4 | 4 | 4 | 4 |
| Inlet SO$_2$ concentration [ppm] | 500 | 500 | 500 | 500 |
| Limestone concentration [mmol/l] | 30 | 30 | 30 | 30 |
| Liquid column tower nozzle spray height [m] | 6 | 6 | 6 | 6 |
| Liquid top portion drift preventing plate installation height [m] | 0 | 1.5 | 0 | 1.5 |
| Header portion drift preventing plate installation height [m] | 0 | 0 | 2 | 2 |
| Spray circulation flow rate [m$^3$/m$^2$/h] | 200 | 200 | 200 | 200 |
| Outlet SO$_2$ concentration [ppm] | 55 | 23 | 36 | 15 |
| SO$_2$ removal efficiency [%] | 89 | 95 | 93 | 97 |

Desulfurizing effects of examples 2 and 3 higher than the effect of example 1 could be confirmed.

EXAMPLES 5 TO 8

For the embodiments explained with reference to FIGS. 4 to 6, four types of tests with the following specifications were conducted. In the test, an exhaust simulated gas was introduced from a lower part of the absorption tower 1, desulfurization was accomplished by using limestone slurry, and SO$_2$ was measured at the outlet in tower top portion to evaluate the performance. As shown in FIGS. 5 and 6, the nozzles 47 above the same spray header 42 were separated 500 mm from each other, and the dummy pipes 45a, 45b, 46a and 46b and the spray pipes 42a and 42b were separated 800 mm from each other in the vertical direction. Also, the dummy pipes 45a, 45b, 46a and 46b were separated 500 mm from each other in a plan view.

The pipe diameter was 318 mm in all examples.
Example 5: Dummy pipes not provided;
Example 6: Only upper dummy pipes 45 provided;
Example 7: Only lower dummy pipes 46 provided; and
Example 8: Both of upper and lower dummy pipes 45 and 46 provided.

Test Conditions and Results

The test conditions and results are given in Table 2.

TABLE 2

| Example | Example 5 | Example 6 | Example 7 | Example 8 |
|---|---|---|---|---|
| In-tower temperature [° C.] | 50 | 50 | 50 | 50 |
| Gas flow velocity [m/s] | 4 | 4 | 4 | 4 |
| Inlet SO$_2$ concentration [ppm] | 500 | 500 | 500 | 500 |
| Limestone concentration [mmol/l] | 30 | 30 | 30 | 30 |
| Liquid column tower nozzle spray height [m] | 6 | 6 | 6 | 6 |
| Dummy pipes over header | Absent | Present | Absent | Present |
| Dummy pipes under header | Absent | Absent | Present | Present |
| Spray circulation flow rate [m$^3$/m$^2$/h] | 200 | 200 | 200 | 200 |
| Outlet SO$_2$ concentration [ppm] | 55 | 45 | 33 | 25 |
| SO$_2$ removal efficiency [%] | 89 | 91 | 93 | 95 |

Desulfurizing effects of examples 6 to 8 higher than the effect of example 5 could be confirmed.

Many other variations and modifications of the invention will be apparent to those skilled in the art without departing from the spirit and scope of the invention. The above-described embodiments are, therefore, intended to be merely exemplary, and all such variations and modifications are intended to be included within the scope of the invention as defined in the appended claims.

The disclosure of Japanese Patent Application No. 2004-317663 filed on Nov. 1, 2004 including specification, claims, drawings and summary are incorporated herein by reference in its entirety.

What is claimed is:

1. A liquid column type exhaust gas treatment apparatus, comprising:
   an absorption tower through which exhaust gas passes from a lower part thereof to an upper part thereof;
   a spray header comprising a plurality of nozzles, each of the nozzles injecting an absorbing solution upward in the absorption tower, wherein the exhaust gas and the absorbing solution are brought into gas-liquid contact with each other, by which desulfurization of exhaust gas is accomplished; and
   drift preventing plates provided only in a liquid top portion of a liquid column formed by the absorbing solution, only at the installation position of the spray header, or only in the liquid top portion and at the spray header installation position, wherein each of the drift preventing plates is provided at the middle between two adjacent nozzles.

2. The exhaust gas treatment apparatus according to claim 1, wherein the drift preventing plates installed in the liquid top portion have a length of 10 to 40% of a height from the spray header to upper ends of the drift preventing plates.

3. A liquid column type exhaust gas treatment apparatus, comprising:
- an absorption tower through which exhaust gas passes from a lower part thereof to an upper part thereof;
- a spray header for injecting an absorbing solution upward in the absorption tower, wherein the exhaust gas and the absorbing solution are brought into gas-liquid contact with each other, by which desulfurization of exhaust gas is accomplished; and
- a columnar liquid drop dispersing member provided on the upper side of the spray header, wherein
- the spray header comprises at least upper and lower header pipes, and
- a distance between the liquid drop dispersing member and the spray header is about 1 to 1.5 times of a distance between the upper and lower header pipes.

4. The exhaust gas treatment apparatus according to claim 3, wherein the columnar liquid drop dispersing member is formed by a member having substantially the same construction as that of a header pipe forming the spray header.

5. The exhaust gas treatment apparatus according to claim 3, wherein the columnar liquid drop dispersing member is provided so that exhaust gas is introduced from the side surface side.

6. The exhaust gas treatment apparatus according to any one of claims 3 to 5, wherein the columnar liquid drop dispersing member is located at an intermediate position of adjacent nozzles above the spray header as viewed from the tower top portion of the absorption tower.

* * * * *